Feb. 22, 1927.

S. C. SPIVEY 1,618,683

ELECTRIC STARTING SYSTEM FOR AUTOMOBILES

Filed March 6, 1926

Samuel Carroll Spivey.
INVENTOR,

BY

ATTORNEY'

Patented Feb. 22, 1927.

1,618,683

UNITED STATES PATENT OFFICE.

SAMUEL CARROLL SPIVEY, OF BRUNDIDGE, ALABAMA.

ELECTRIC STARTING SYSTEM FOR AUTOMOBILES.

Application filed March 6, 1926. Serial No. 92,814.

My invention is an improvement in the system of starting the engine of an automobile by an electric-motor geared thereto and relates more especially to devices for controlling the circuit from the storage battery to the electric-motor.

The primary object of my invention is to provide simple and reliable means including a particular form of relay whereby the starting motor is connected in circuit with the storage battery on the closing of a manually operated switch in a shunt circuit from the battery through the relay, switch, and generator, and said circuit to the starting motor broken automatically when current is produced by the generator after the engine is started thus eliminating the usual foot-operated push-button or switch.

With this principal object in view my invention consists in combining with the storage-battery, starting-motor and generator a relay in the circuit from the battery to the starting-motor energized by a shunt circuit from the battery through said relay to the generator for energizing the relay from the battery to close the aforesaid circuit to the starting-motor and for operating the relay by current from the generator to open said circuit when the engine is started, all as hereinafter fully described and specifically set forth in the appended claims.

Figure 1:
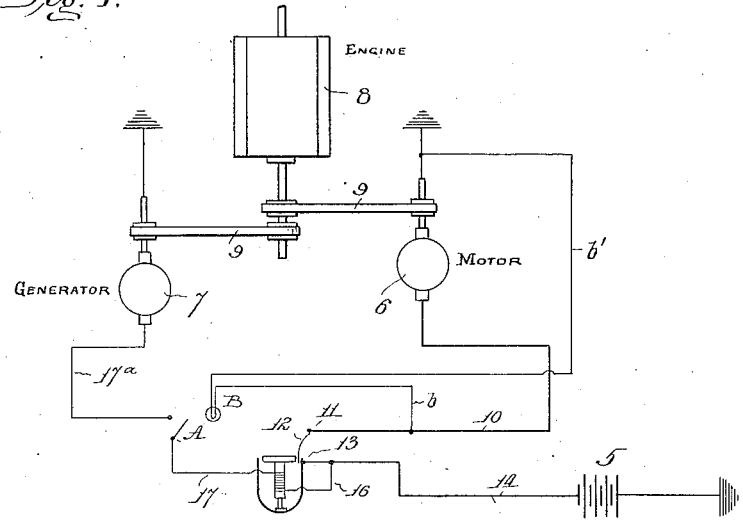
Figure 1 is a diagrammatic view showing the several elements of the system and electric connections forming the circuits.
Figure 2:
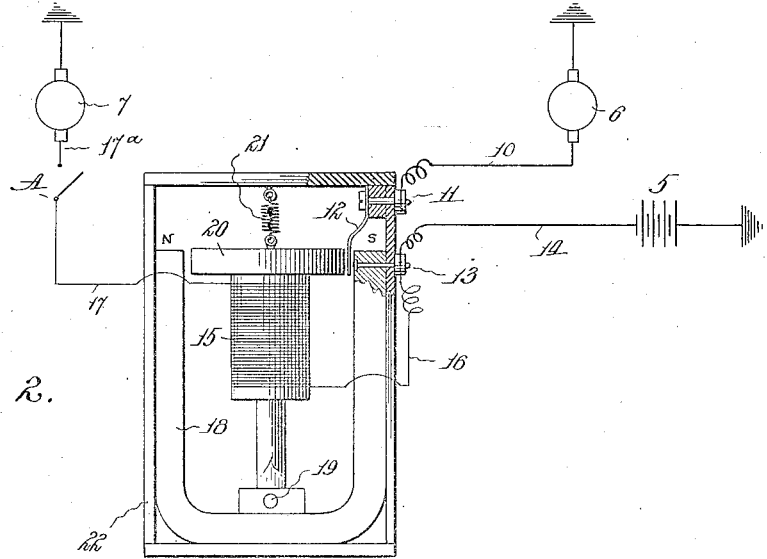
Fig. 2 is a similar view, including an enlarged detail view of the polarized relay.

In carrying out my invention the electrical devices for controlling the operation of the starting motor are employed in connection with a storage battery 5, electric starting motor 6, electric generator 7 and internal combustion 8, all as used in connection with an automobile; the motor and generator being geared to the engine in the usual manner (belt connections 9 being shown in the diagram merely for convenience of illustration).

In the present instance the starting motor 6 is connected by wire 10 to the binding-post 11 of a switch-member 12, the latter being in the form of a spring plate with its free end normally out of contact with the inner end of a binding-post 13 electrically connected to the storage-battery 5 by wire 14; whereby when the switch 12 is closed, in the manner hereinafter described, the circuit will be from the battery by wire 14 to binding-post 13, through the switch-member to binding-post 11, and to the motor 6 by wire 10, being grounded from the motor as indicated. For automatically closing and opening switch 12 when switch A is closed the spring member of said switch 12 is moved in contact with binding-post 13 by means of a swinging electro-magnet 15 which is electrically connected to the storage-battery 5 by a light wire 16 preferably tap-wire 14 at binding-post 13, and to the generator 7 by a light wire 17 with a manually-operated switch A between the generator and said electro-magnet, whereby a circuit may be established through the electro-magnet from the battery to the generator, and vice versa, when switch A is closed; the electro-magnet for this purpose cooperating with a permanent magnet 18 between which it is located for swinging movement on pivot 19 with the armature 20 thereof working between the poles of said permanent magnet. The outer or free end of the switch-member 12 is positioned between the armature and one of the poles, the south pole, of the permanent magnet through which binding-post 13 passes, whereby when the electro-magnet is energized by current from the storage-battery, or positive side thereof, it will be attracted to this pole of the permanent magnet moving said switch-member against the binding-post closing the switch in the circuit from battery to motor; and when said electro-magnet is energized by current flowing from the generator its armature will be repelled opening the switch to thereby cut out the starting motor. To prevent accidental closing of the switch 12 a torsion spring 21 is connected to the electro-magnet and to a box 22 in which the magnets of this automatic relay are enclosed.

In the normal position of the parts constituting my improved electric starting system for automobiles, with switch A open, the electro-magnet 15 is deenergized and the armature thereof in intermediate position between the poles of the permanent magnet with the spring plate or switch-member 12 out of contact with the binding-post 13 maintaining an open switch or broken circuit between the storage-battery and motor. Now to start the motor it is necessary only to close manually-operated switch A causing a circuit from the battery through the electro-magnet to generator and ground energizing said electromagnet which closes the switch 12, in the manner hereinbefore described, which controls the circuit from the battery to the motor, and when the motor cranks the engine which is geared to the generator the latter produces current which flows by wire 17ª, switch A, and wire 17 through the electromagnet to the battery changing the polarity of the armature of said electro-magnet so that it will be repelled from the south pole of the permanent magnet and attracted to the north pole thereof releasing the switch-member 12 so that it will spring out of contact with binding-post 13 and open the switch in the circuit from the storage-battery to the motor cutting out the latter.

It will be understood that in applying my improved electrical devices an ignition switch will be used in the connections with the generator, and that the foot-operated starter-button usually employed for closing the circuit between the storage-battery and electric motor is dispensed with, inasmuch as by closing switch A the motor will be automatically put in circuit with the battery and automatically cut out when the generator produces current by the operation of the engine. By eliminating the starter-button it removes the possibility of injury to the starting mechanism by stepping on the start button accidentally as sometimes happens with the conventional system of electric starter; in other words the devices hereinbefore described provide an arrangement that is not only entirely automatic in operation but also provides a measure of safety to the starting mechanism as well as a safer operation of the automobile.

For the purpose of indicating to the operator that the starting motor is in circuit with the battery I locate a small electric light B alongside of switch A and connect it by wires $b$ $b'$ in parallel with the motor, and being in this circuit it will cooperate with said switch to check against the latter being left closed after the engine is started, and also indicate whether or not the switch-member 12 is being properly operated by the relay.

I claim:—

1. A starter for internal combustion engines comprising a source of electric current, electric starting-motor and generator, together with a polarized relay having its operating coil connected in the circuit from the generator to the motor, and means controlled by said relay for opening said circuit.

2. A starter for internal combustion engines comprising a source of electric current, electric starting-motor and generator; together with a polarized relay having its operating coil connected in the circuit from the generator to the source of electric current and to the motor, and means controlled by said relay for opening the circuit between the source of electric current and motor.

SAMUEL CARROLL SPIVEY.